US012749775B2

(12) United States Patent
Bojanowski et al.

(10) Patent No.: US 12,749,775 B2
(45) Date of Patent: Sep. 29, 2026

(54) TRACTION BATTERY ASSEMBLY HAVING BUSBAR MODULE

(71) Applicant: FORD MOTOR COMPANY, Dearborn, MI (US)

(72) Inventors: Paul John Bojanowski, Macomb Township, MI (US); Brian Utley, Canton, MI (US); Michael Orr, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 818 days.

(21) Appl. No.: 18/085,135

(22) Filed: Dec. 20, 2022

(65) Prior Publication Data

US 2024/0204366 A1 Jun. 20, 2024

(51) Int. Cl.

*H01M 50/516* (2021.01)
*B60L 50/64* (2019.01)
*H01M 50/204* (2021.01)
*H01M 50/503* (2021.01)
*H01M 50/522* (2021.01)
*H01M 50/552* (2021.01)

(52) U.S. Cl.

CPC ........... *H01M 50/516* (2021.01); *B60L 50/64* (2019.02); *H01M 50/204* (2021.01); *H01M 50/503* (2021.01); *H01M 50/522* (2021.01); *H01M 50/552* (2021.01); *H01M 2220/20* (2013.01)

(58) Field of Classification Search

CPC ................................. B60L 50/64; Y02E 60/10
See application file for complete search history.

(56) References Cited

U.S. PATENT DOCUMENTS

| | | | |
|---|---|---|---|
| 4,936,405 A | 6/1990 | Hrovat | |
| 9,404,575 B2 | 8/2016 | Somerville et al. | |
| 10,407,072 B2 | 9/2019 | Hertel et al. | |
| 2005/0096820 A1 | 5/2005 | Soliman et al. | |

(Continued)

FOREIGN PATENT DOCUMENTS

| | | | |
|---|---|---|---|
| CN | 115117564 A * | 9/2022 | ............ H01M 50/59 |
| JP | 7288671 B2 * | 6/2023 | |

(Continued)

OTHER PUBLICATIONS

Machine translation KR10242640B1 (Year: 2025).*

(Continued)

*Primary Examiner* — Brian R Ohara
*Assistant Examiner* — M. T. Leonard
(74) *Attorney, Agent, or Firm* — David B. Kelley; Brooks Kushman P.C.

(57) ABSTRACT

A traction battery includes a stack of cells each having two terminals. Sets of terminals are connected to busbars to electrically connect the battery cells. The busbars have a base, a set of connecting portions, and a set of stiffeners. The terminals have protruding portions and receding portions. As the busbar is positioned with respect to the battery stack, the connecting portions guide the receding portions into position by deflecting the protruding portions. The receding portions are then welded to the connecting portions. The deflected protruding portion forces the parts to be welded together, eliminating a need for clamping during the welding process.

20 Claims, 4 Drawing Sheets

(56) References Cited

U.S. PATENT DOCUMENTS

| | | | |
|---|---|---|---|
| 2007/0095589 A1 | 5/2007 | Tamai et al. | |
| 2018/0229712 A1 | 8/2018 | Shelton et al. | |
| 2019/0267603 A1* | 8/2019 | Chi | H01M 50/505 |

FOREIGN PATENT DOCUMENTS

| | | | | |
|---|---|---|---|---|
| KR | 102411256 B1 * | 6/2022 | | H01M 10/613 |
| KR | 102424640 B1 * | 7/2022 | | H01M 50/502 |
| WO | WO-2022160297 A1 * | 8/2022 | | H01M 50/514 |

OTHER PUBLICATIONS

Machine translation KR102411256B1 (Year: 2025).*
CN115117564A machine translation (Year: 2026).*
JP7288671B2 machine translation (Year: 2026).*
WO2022160297A1 machine translation (Year: 2026).*

* cited by examiner

TRACTION BATTERY ASSEMBLY HAVING BUSBAR MODULE

TECHNICAL FIELD

The present disclosure relates to traction battery assemblies for motor vehicles, and more specifically to traction battery assemblies having busbar modules.

BACKGROUND

Vehicles such as battery-electric vehicles and hybrid-electric vehicles contain a traction battery assembly to act as an energy source for the vehicle. The traction battery may include components and systems to assist in managing vehicle performance and operations. The traction battery may also include high-voltage components and may include an air or liquid thermal-management system to control the temperature of the battery.

SUMMARY

According to one embodiment, a traction battery includes a stack of battery cells and a busbar. Each of the battery cells includes a terminal having a projecting portion extending from a body of the battery cell and a flat receding portion disposed at a first acute angle on a distal end of the projecting portion. The busbar includes a base and a plurality of flat connecting portions extending at a second acute angle from the base. A sum of the first acute angle and the second acute angle may be less than 90 degrees. The busbar may also include a plurality of stiffeners each extending between the base and a distal end of one of the connecting portions. Windows may be defined on the sides of the connecting portions and stiffeners. A thickness of the connecting portions may be less than one half of a thickness of the base and less than one half of a thickness of the stiffeners. Each flat receding portion is welded to a corresponding flat connecting portion. Each projecting portion may be deflected by a separating force between the corresponding receding portion and the corresponding connecting portion.

According to another embodiment, a traction battery includes a stack of battery cells and a busbar. Each of the battery cells includes a terminal having a projecting portion extending from a body of the battery cell and a flat receding portion disposed at an acute angle on a distal end of the projecting portion. The busbar has a central region and two side regions. Windows may be defined between the side regions and the central region. The central region defines a plurality of corrugations. Each corrugation includes a flat connecting portion and may include a stiffener. A thickness of the connecting portion may less than one half of a thickness of the stiffener and may be less than one half of a thickness of the side regions. Each flat receding portion is welded to a corresponding flat connecting portion. Each projecting portion may be deflected by a separating force between the corresponding receding portion and the corresponding connecting portion.

A method of assembling a traction battery includes bringing a busbar and a stack of battery cells together and then welding. The busbar includes a base and a plurality of flat connecting portions extending at a second acute angle from the base. Stiffeners may extend between the base and distal ends of the connecting portions. Each battery cell of the stack of battery cells includes a terminal having a projecting portion extending from a body of the battery cell and a flat receding portion disposed at a first acute angle on a distal end of the projecting portion. The busbar and battery cells are brought together such that separating forces between the flat connecting portions and the flat receding portion deflect the corresponding projecting portions. Each connecting portion is welded to a corresponding receding portion. The busbar may be formed by stamping a sheet metal blank to form the connecting portions and the stiffeners. Stamping the sheet metal blank may reduce a thickness of the connecting portions to less than one half of a thickness of the base.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
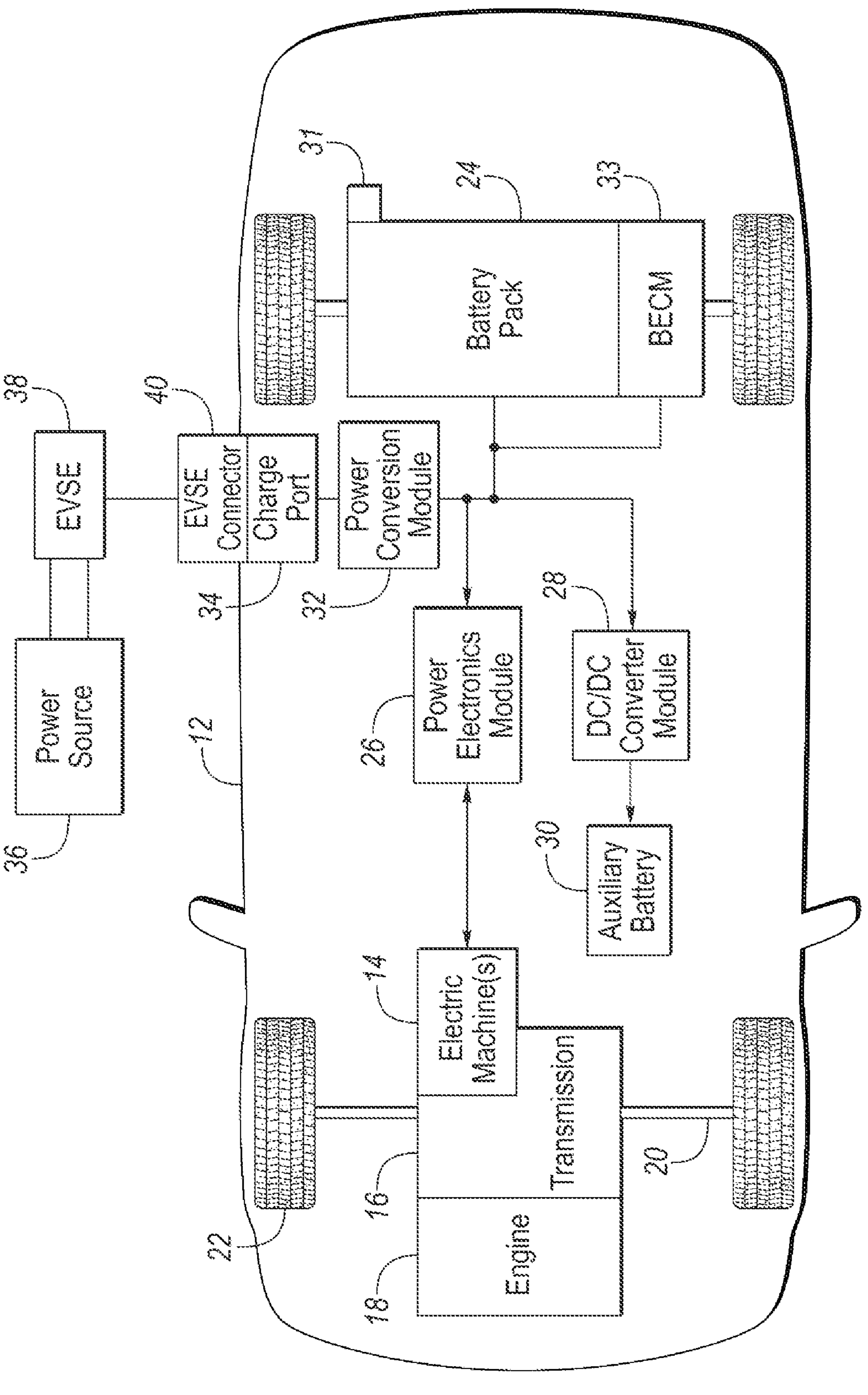
FIG. 1 is a schematic diagram of an example hybrid vehicle.

FIG. 1 depicts a schematic of a plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and braking capability when the engine 18 is turned on or off. The electric machines 14 also act as generators and can provide fuel economy benefits by recovering energy through regenerative braking. The electric machines 14 reduce pollutant emissions and increase fuel economy by reducing the workload of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays include one or more battery cells.

The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally managed with a thermal management system. Examples of thermal management systems include air cooling systems, liquid cooling systems, and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to fully electric vehicles. In a fully electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30, e.g., a 12-volt battery.

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus, e.g., Controller Area Network (CAN), or via dedicated electrical conduits.

Figure 2:
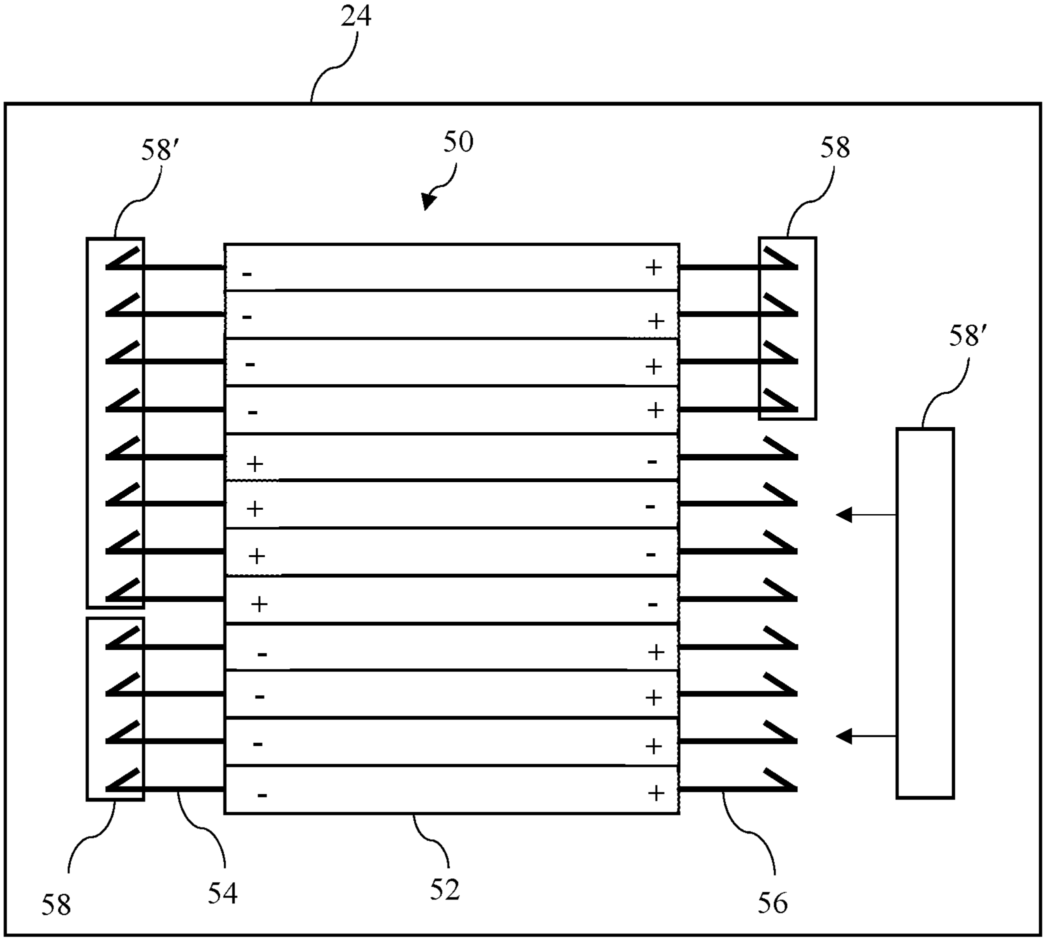
FIG. 2 is a cross-sectional view of a traction battery assembly of the hybrid vehicle of FIG. 1.

FIG. 2 illustrates a battery cell stack 50 within traction battery 24. Battery 24 may include one or more such battery cell stacks. Battery cell stack 50 includes a plurality of battery cells 52. In the illustrated embodiment, there are twelve battery cells in the stack, but the number may vary. Each battery cell 52 includes a negative terminal (cathode) 54 and a positive terminal (anode) 56. The positive and negative terminals may extend from opposite ends of the battery cell body as illustrated in FIG. 2 or may be arranged differently, such as side by side. The terminals of the battery cells 52 are electrically connected to one another using busbars 58 and 58'. To connect a group of cells in parallel, the negative terminals of each cell in the group are connected to a first busbar and the positive terminals of each cell in the group are connected to a second busbar. In the example of FIG. 2, there are three groups each consisting of four cells connected in parallel. To connect cells in series, the positive terminals of one cell (or group) are connected to the same busbar as the negative terminals of the other cell (or group). In the example of FIG. 2, the three groups of cells are connected to one another in series.

Figure 3:
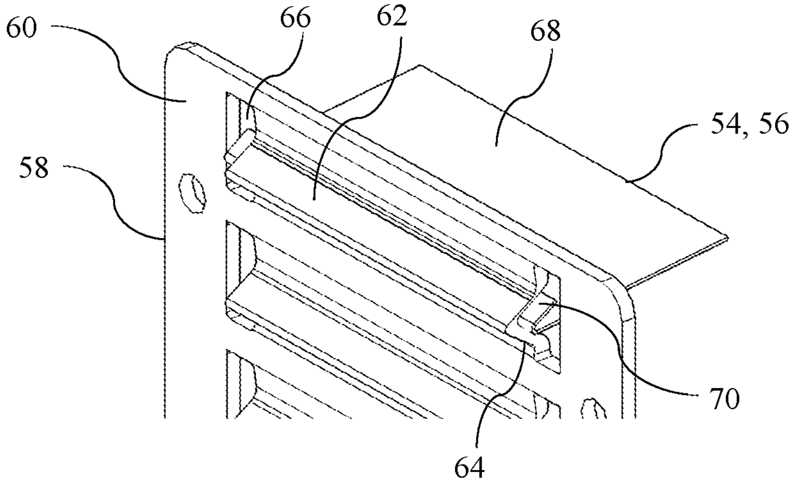
FIG. 3 is a perspective view of a busbar and terminal of the battery assembly of FIG. 2.

FIG. 3 is a pictorial view showing part of one of the busbars 58 and one of the terminals 54 or 56 in an assembled condition. For clarity, other components are not shown in this figure. Busbar 58 includes several portions, including a base 60, a plurality of connecting portions 62, and a plurality of stiffeners 64. The connecting portions 62, which are flat, extend at an acute angle from the base. The stiffeners also extend from the base and connect to a distal end of the connecting portion. Windows 66 are defined on the sides of each connecting portion, stiffener pair. These windows facilitate inspection of the battery cell stack. The terminals 54 or 56 are bent to create a projecting portion 68 and a receding portion 70 which are at an acute angle to one another. The receding portion, which is flat, is in contact with one of the connecting portions. Preferably, this contact occurs over a significant percentage of the area of the receding portion and the connecting portion, minimizing electrical resistance at the boundary between these parts. The receding portion may be attached to the connecting portion by a weld, such as a laser weld.

Figure 4:
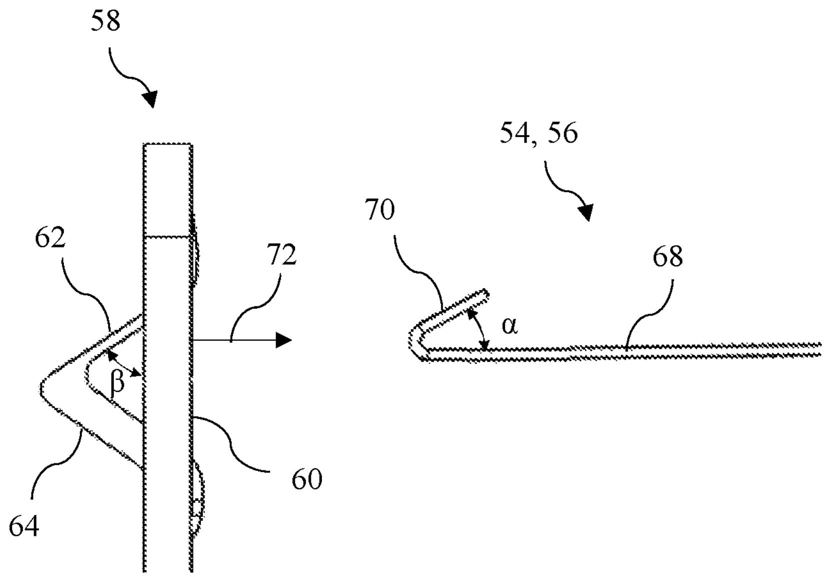
FIG. 4 a cross-sectional view of the busbar and terminal of FIG. 3 before assembly.

FIG. 4 is a side view of part of a busbar 58 and a terminal 54 or 56 prior to assembly. Projecting portion 68 and receding portion 70 form an angle $\alpha$. Base 60 and connecting portion 62 form an angle $\beta$. The angles $\alpha$ and $\beta$ are nearly complementary but may add to slightly less than 90 degrees to account for deflection of the projecting portion 68 as will be discussed below. Notice that connecting portion 62 is substantially thinner than either the base 60 or the stiffener 64. Specifically, connecting portion 62 is less than one half of the thickness of base 60 and may be less than one third of the thickness of base 60. The thickness of connecting portion 62 is similar to the thickness of receding portion 70. This thickness facilitates welding as discussed below.

Figure 5:
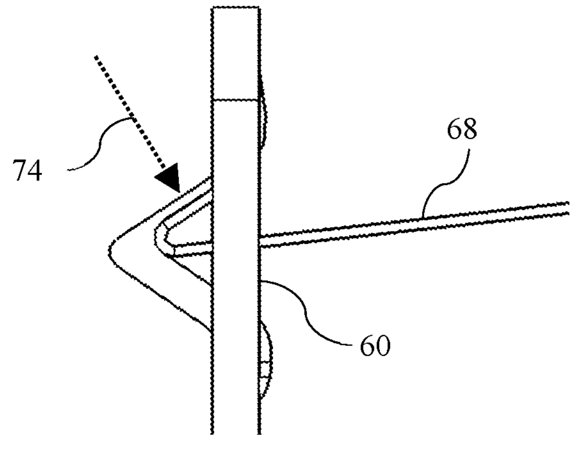
FIG. 5 a cross-sectional view of the busbar and terminal of FIG. 3 after the busbar is positioned with respect to the battery stack.

During assembly of the battery cell stack, busbar 58 is moved into contact with several terminals as indicated by arrow 72 such that the parts have the relative positioning illustrated in FIG. 5. The busbar at the battery cells is aligned such that the projecting portion 68 deflects as the parts are brought into position. This deflection establishes a separating force 74 between the connecting portion 62 and the receding portion 70 which ensures contact. The angles α and β are preferably selected such that this contact occurs over as large of an area as possible. After the parts are positioned, a laser beam is used to create a weld joint between the connecting portion 62 and the receding portion 70. It is desirable for the surface being welded to be horizontal during the welding operation. Therefore, a fixture may hold the assembly at an angle during the welding operation to ensure a horizontal surface. Since contact is ensured, clamping is not necessary during the welding procedure. If clamping is desired, however, a clamp may be inserted through the window 66.

The busbar and terminal design as described above provides several advantages. The terminal does not protrude past the connecting portion and stiffener of the busbar. The window allows visual confirmation of correct orientation and positioning. The bends in the busbar prevent the connecting portion from warping, ensuring a flat weldable surface. Similarly, the bend in the terminal prevents the receding portion from warping, ensuring a flat surface for welding. The weldable area is relatively large. The gap between parts to be welded is reliably small or non-existent even in the presence of part-to-part variability. External clamping is not required during welding.

Figure 6:
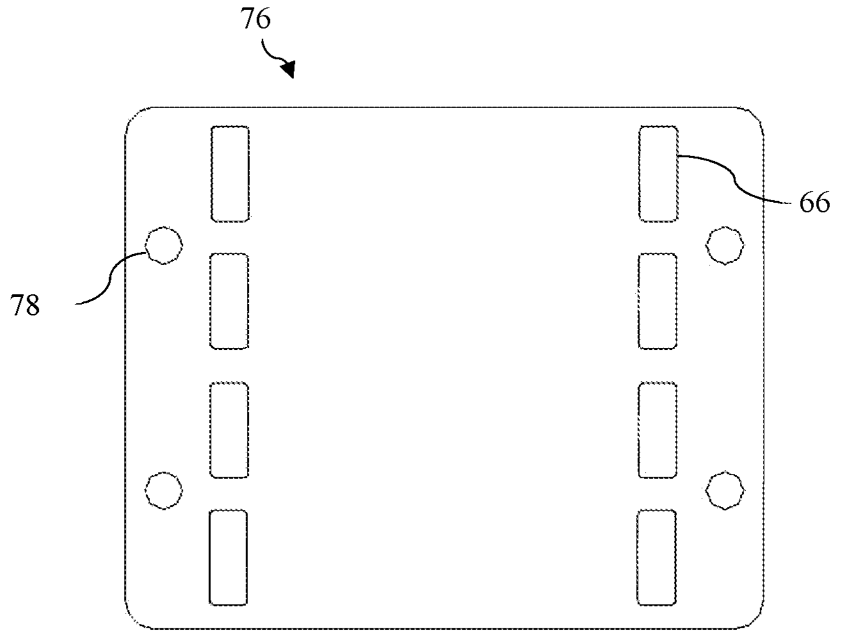
FIG. 6 is a front view of a sheet metal blank suitable for fabrication of a busbar.
Figure 7:
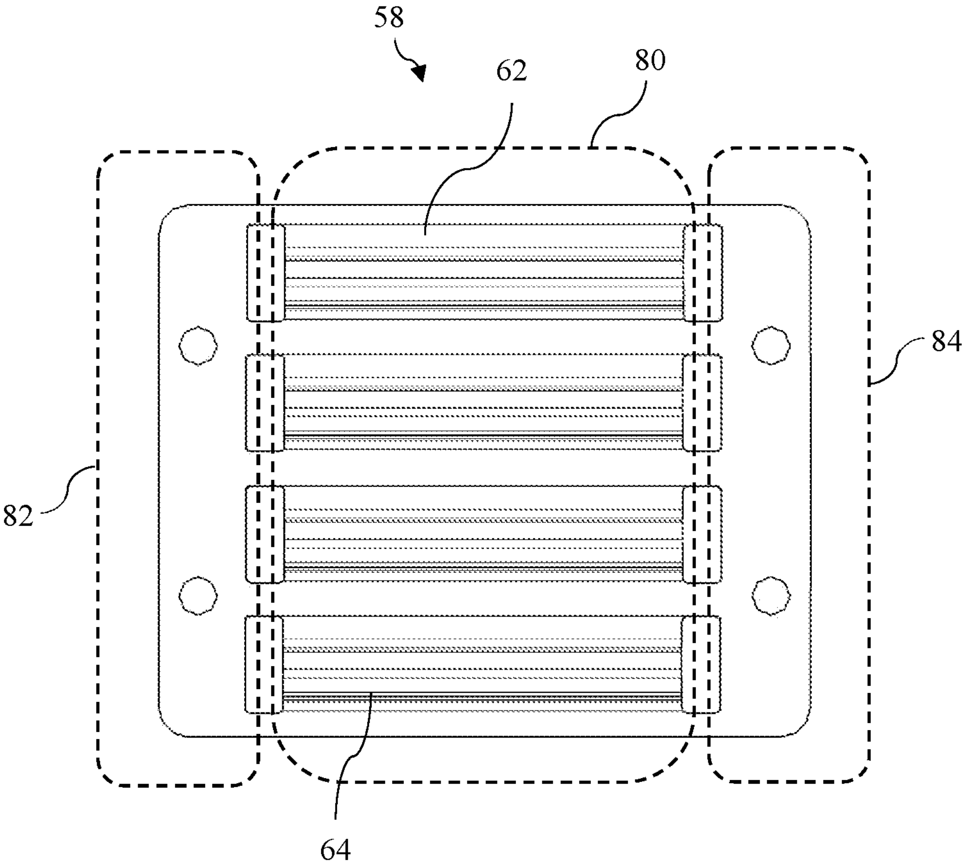
FIG. 7 is a front view of a stamped busbar.

The busbar may be efficiently fabricated using a stamping process. FIG. 6 illustrates a sheet metal busbar blank 76. In a first stamping operation, or series of operations, the windows 66 and attachment features 78 (in this case holes) may be formed. In a second series of stamping operations, the connection portions and the stiffeners are formed between pairs of windows, as illustrated in FIG. 7. During these operations, the sheet metal that forms the connecting portion is stretched such that the thickness is reduced as shown in FIGS. 4 and 5. Notice in FIG. 7 that the completed busbar includes several regions, including a central region 80 and two side regions 82 and 84. The central region defines a repeating pattern of connecting portions, stiffeners, and portions which connect to the side regions between windows. This repeating pattern may be referred to as a corrugation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A traction battery comprising:

a stack of battery cells, wherein each of the battery cells includes a terminal having a projecting portion extending from a body of the battery cell and a flat receding portion disposed on a distal end of the projecting portion such that the receding portion forms a first acute angle with the projecting portion; and a busbar including a base and a plurality of flat connecting portions extending at a second acute angle from the base; wherein each flat receding portion is welded to a corresponding flat connecting portion; and the terminals do not extend through the busbar.

2. The traction battery of claim 1 wherein the busbar further includes a plurality of stiffeners each connected to a distal end of one of the connecting portions and extending from the connecting portion towards the base.

3. The traction battery of claim 2 wherein the busbar defines a first set of windows at first sides of the stiffeners and the connecting portions.

4. The traction battery of claim 3 wherein the busbar defines a second set of windows at second sides of the stiffeners and the connecting portions.

5. The traction battery of claim 2 wherein a thickness of the connecting portions is less than one half of a thickness of the base and less than one half of a thickness of the stiffeners.

6. The traction battery of claim 1 wherein a sum of the first acute angle and the second acute angle is less than 90 degrees.

7. The traction battery of claim 1 wherein each projecting portion is deflected by a separating force between the corresponding receding portion and the corresponding connecting portion.

8. A traction battery comprising:

a stack of battery cells, wherein each of the battery cells includes a terminal having a projecting portion extending from a body of the battery cell and a flat receding portion disposed on a distal end of the projecting portion such that the receding portion forms an acute angle with the projecting portion; and a busbar having a central region defining a plurality of corrugations, each corrugation including a flat connecting portion, and two side regions each connected to the central region between adjacent connecting portions; wherein each flat receding portion is welded to a corresponding flat connecting portion; and each receding portion is closer to the body of the battery cell than the corresponding connecting portion.

9. The traction battery of claim 8 wherein each corrugation further includes a stiffener connected to a distal edge of the connecting portion.

10. The traction battery of claim 9 wherein a thickness of the connecting portion is less than one half of a thickness of the stiffener.

11. The traction battery of claim 8 wherein the busbar defines two sets of windows between respective side regions and the central region.

12. The traction battery of claim 8 wherein a thickness of the connecting portion is less than one half of a thickness of the side regions.

13. The traction battery of claim 8 wherein each projecting portion is deflected by a separating force between the corresponding receding portion and the corresponding connecting portion.

14. A traction battery comprising:

a stack of battery cells, wherein each of the battery cells includes a terminal having a projecting portion extending from a body of the battery cell and a flat receding portion disposed on a distal end of the projecting portion such that the receding portion forms a first acute angle with the projecting portion; and a busbar including a base and a plurality of flat connecting portions extending at a second acute angle from the base; wherein each flat receding portion is welded to a corresponding flat connecting portion; and each receding portion is closer to the body of the battery cell than the corresponding connecting portion.

15. The traction battery of claim 14 wherein the terminals do not extend through the busbar.

16. The traction battery of claim 14 wherein the busbar further includes a plurality of stiffeners each connected to a distal end of one of the connecting portions and extending from the connecting portion towards the base.

17. The traction battery of claim 16 wherein the busbar defines a first set of windows at first sides of the stiffeners and the connecting portions.

18. The traction battery of claim 17 wherein the busbar defines a second set of windows at second sides of the stiffeners and the connecting portions.

19. The traction battery of claim 16 wherein a thickness of the connecting portions is less than one half of a thickness of the base and less than one half of a thickness of the stiffeners.

20. The traction battery of claim 14 wherein a sum of the first acute angle and the second acute angle is less than 90 degrees.

* * * * *